(12) United States Patent
Marhefka et al.

(10) Patent No.: US 8,502,763 B2
(45) Date of Patent: Aug. 6, 2013

(54) ELECTRONIC SKIN HAVING UNIFORM GRAY SCALE REFLECTIVITY

(75) Inventors: Duane W. Marhefka, Winona, OH (US); Nithya Venkatataman, Wooster, OH (US); Sankar Barua, Stow, OH (US)

(73) Assignee: Manning Ventures, Inc., Fairport, NY (US)

( * ) Notice: Subject to any disclaimer, the term of this patent is extended or adjusted under 35 U.S.C. 154(b) by 140 days.

(21) Appl. No.: 13/269,824

(22) Filed: Oct. 10, 2011

(65) Prior Publication Data
US 2012/0086735 A1    Apr. 12, 2012

Related U.S. Application Data

(62) Division of application No. 12/152,862, filed on May 16, 2008, now Pat. No. 8,310,630.

(51) Int. Cl.
*G09G 3/36* (2006.01)
(52) U.S. Cl.
USPC .............. 345/89; 345/107; 345/204; 345/690
(58) Field of Classification Search
USPC ....... 345/107, 89, 690–699, 204, 87, 98–100; 359/269
See application file for complete search history.

(56) References Cited

U.S. PATENT DOCUMENTS

| | | |
|---|---|---|
| 4,685,771 A | 8/1987 | West et al. |
| 5,437,811 A | 8/1995 | Doane et al. |
| 5,453,863 A | 9/1995 | West |
| 5,644,330 A | 7/1997 | Catchpole et al. |
| 5,933,203 A | 8/1999 | Wu et al. |
| 6,133,895 A | 10/2000 | Huang |
| 6,268,839 B1 | 7/2001 | Yang et al. |
| 6,359,673 B1 | 3/2002 | Stephenson |
| 6,377,321 B1 | 4/2002 | Khan et al. |
| 6,654,080 B1 | 11/2003 | Khan et al. |
| 6,752,430 B2 | 6/2004 | Holt et al. |
| 6,788,362 B2 | 9/2004 | Stephenson |
| 7,061,559 B2 | 6/2006 | Khan et al. |
| 7,142,190 B2 | 11/2006 | Martinez |
| 7,170,481 B2 | 1/2007 | Doane et al. |
| 7,188,996 B2 | 3/2007 | Parker |
| 7,236,151 B2 | 6/2007 | Doane et al. |
| 7,351,506 B2 | 4/2008 | Schneider et al. |
| 7,719,501 B2 * | 5/2010 | Ben-Shalom et al. .......... 345/87 |
| 2005/0259055 A1 * | 11/2005 | Ma .................................. 345/87 |
| 2007/0126674 A1 | 6/2007 | Doane et al. |
| 2007/0152928 A1 | 7/2007 | Doane et al. |
| 2008/0074383 A1 | 3/2008 | Dean |

OTHER PUBLICATIONS

"Cholesteric Liquid Crystals for Flexible Displays" in Flexible Flat Panel Displays, Ed. g. Crawford, (John Wiley & Sons, 2005) J.W. Doane and A. Khan, Chapter 17.

* cited by examiner

*Primary Examiner* — Bipin Shalwala
*Assistant Examiner* — Lisa Landis
(74) *Attorney, Agent, or Firm* — Pearne & Gordon LLP

(57) ABSTRACT

The invention features electronic skin including an active layer formed of bistable cholesteric liquid crystal material and articles comprising the skin, the electronic skin having uniform gray scale reflectivity. Also featured is method for producing suitable reduction pulses that will provide a display (e.g., the electronic skin) with uniform gray scale reflectivity. Reduction pulses of narrow width are used to create uniform levels of gray in the electronic skin to overcome display imperfections that cause discontinuity in the gray scale reflectivity.

17 Claims, 13 Drawing Sheets

Figure 2
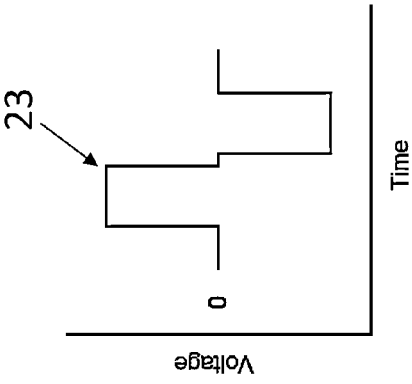
Figure 2a
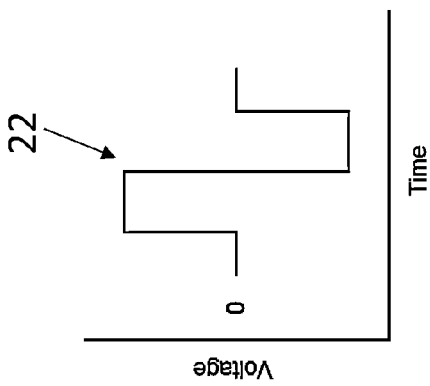
Figure 2b
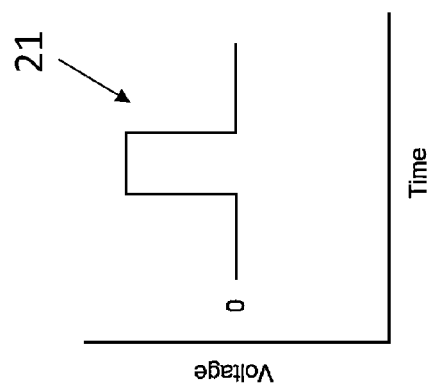
Figure 2c
Prior Art

Figure 3
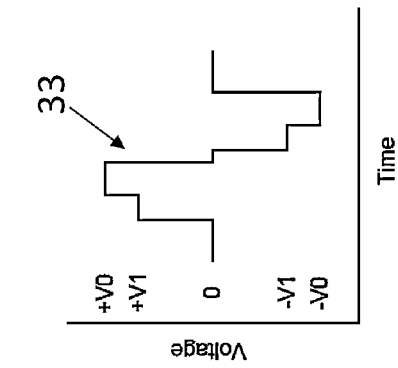
Figure 3a
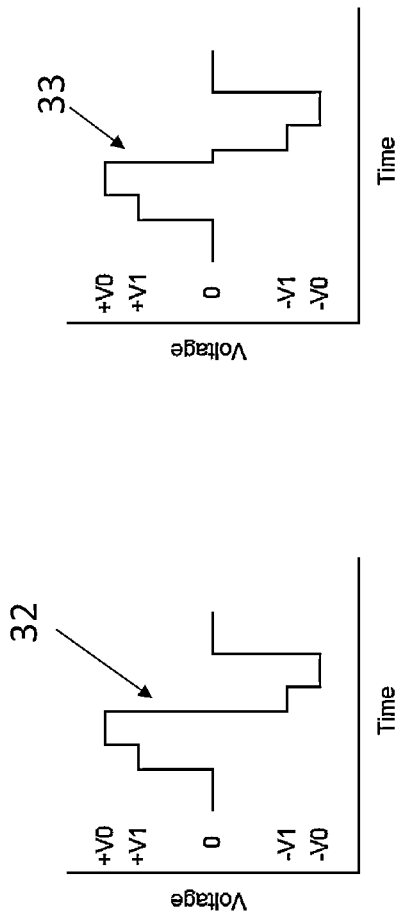
Figure 3b
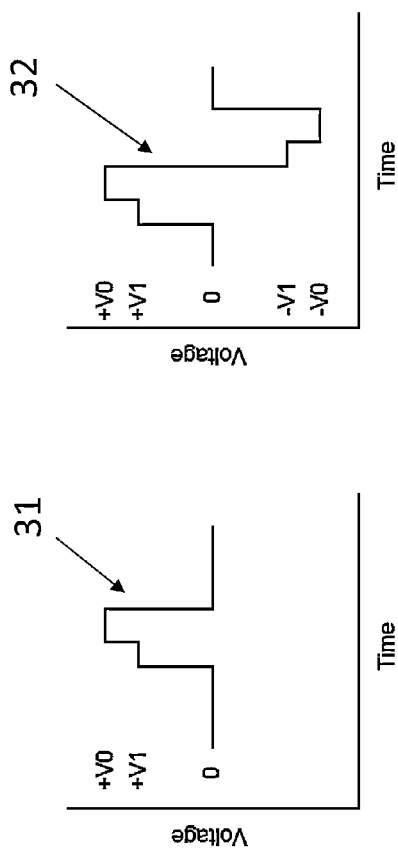
Figure 3c
Prior Art

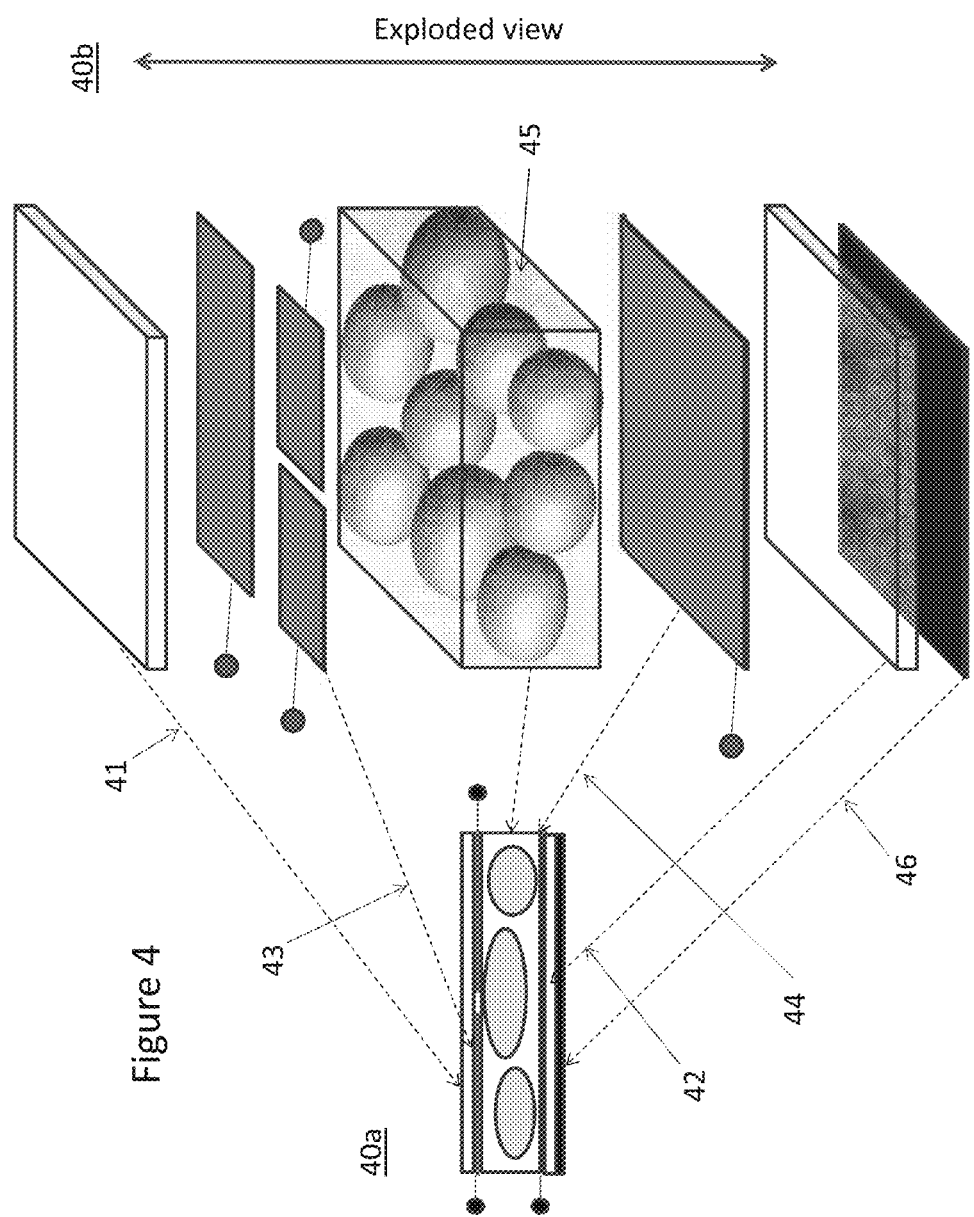

ELECTRONIC SKIN HAVING UNIFORM GRAY SCALE REFLECTIVITY

This application is a divisional of U.S. patent application Ser. No. 12/152,862, filed on May 16, 2008 now U.S. Pat. No. 8,310,630, which is incorporated herein by reference.

FIELD OF THE INVENTION

The invention pertains to gray scale of electro-optic devices and, in particular to achieving uniform gray scale of liquid crystal devices that are susceptible to gray scale discontinuities, therefore enabling electronic skins that can exhibit uniform tunable colors over a large area.

BACKGROUND OF INVENTION

Bistable cholesteric liquid crystal displays were introduced in the early 1990's (see U.S. Pat. Nos. 5,437,811 and 5,453,863). Their zero-power image retention and sunlight readability led to their integration into numerous signs and battery-powered applications as reviewed in "Cholesteric Liquid Crystals for Flexible Displays" in *Flexible Flat Panel Displays*, Ed. G. Crawford, (John Wiley & Sons, 2005) J. W. Doane and A. Khan, Chapter 17. The technology is best suited for reflective color images. In the cholesteric display technology, multiple-color and full-color displays are preferably produced by stacking multiple cholesteric liquid crystal layers with each tuned to reflect a different wavelength, typically red, green, and blue (see U.S. Pat. No. 6,654,080). These three colors are additively mixed to achieve up to eight colors. Images with more colors are possible because the technology is amenable to grayscale. That is, the reflective brightness of each color can be electronically adjusted to any desired level between the display's maximum and minimum brightness. Each level of brightness is referred to as a gray level. The total number of colors depends upon the number of gray levels one can choose for each color layer. High resolution displays with as many as 4096 colors have been produced.

Commercial bistable cholesteric displays of the prior art display digital images and as such are made using of a matrix of pixels with each of the pixels having a small area. The resolution of the display depends upon the number of pixels and size of the display. Typical pixel sizes are substantially less than one square millimeter. These displays are typically manufactured on glass substrates. Recent progress has been made in commercializing displays built on flexible plastic substrates rather than glass. The new flexible displays are manufactured with a simple lamination process, and may be cut into interesting shapes after assembly. Of significance, these displays are very thin since thin plastic sheet material as thin as 12.5 microns can be used for the substrates making possible a display with the over all thickness less that 60 microns. Using cholesteric liquid crystals dispersed as emulsified droplets has made possible even thinner displays since all the materials of the display including the electrodes, substrates and cholesteric dispersion can be coated in thin layers.

Such developments suggest a display film that can be electronically switched from one color to another color that can be laminated to flat surfaces and even made to conform to curved surfaces in the form of a skin. Consumers frequently identify color as a necessity for several types of products, such as; clothing, accessories, hand held electronics such cell phones, personally worn electronics, medical indicators, and decorative items. The color on these items is defined on the product when purchased. Conventionally, it has not been possible to electronically change the color of these items after the initial purchase. Thin flexible displays for changing the color of articles, for example, an electrochromic layer or a cholesteric display skin for changing the color of cell phones, have been described in the patent literature but such devices have not been successfully implemented (Published Patent Application No. 2008/0074383 and U.S. Pat. No. 7,142,190). Such cholesteric display skins would suffer from a problem of gray scale discontinuity discussed below. Other products incorporate a color change indicator for either a sensorial signal to indicate the product is properly working or to indicate the user's attention is required. Several color indicator products exist such as battery testers (U.S. Pat. No. 7,188,996) and self expiring security badges (U.S. Pat. No. 6,752,430).

Cholesteric display films have not been suitable for electronic skin applications with tunable uniform colors because uniform gray levels have not been possible in areas around one square centimeter and larger. In areas of such size, the inventors have noticed that levels of gray become very non-uniform or blotchy in appearance. The reason for this is not completely understood but it is believed by the inventors to be a result of several possible causes such as: non-uniform cell gap thickness (varying distance between electrodes) and non-uniform conductivity of transparent electrodes. Such features have not been a problem in typical cholesteric matrix displays because the pixels are so very small that gray levels appear uniform on the scale of a pixel and image content makes the non-uniformity hard to detect across many pixels. Furthermore, nearly all commercial displays have been driven in a binary (on/off) mode not utilizing shades of gray.

Cholesteric Liquid Crystal Display Prior Art:

Prior art bistable cholesteric display technology has been used on digital displays incorporating a matrix of small pixels. The most suitable matrix for the cholesteric technology has been the passive matrix because of a unique voltage threshold in its electrooptic voltage response curve. A passive matrix is a plurality of row electrodes on one substrate and a plurality of column electrodes on the opposing substrate orthogonal to the row electrodes. Intersection of the row and column electrodes forms a matrix of pixels of the liquid crystal material between the electrodes. As the electrode rows and columns are very thin in such passive matrix displays, each of the pixels has a very small area, of the order of a square millimeter or much less, providing the display with high resolution. Row and column voltage waveforms are applied to the pixels using row and column driver circuitry, changing the reflective states of the pixels. The voltage threshold characteristic of a bistable cholesteric material allows the pixels in each row to be independently addressed while unaffecting the others. A passive matrix display is addressed a row at a time until the entire display is addressed with an image. Because of bistability, the image is retained on the display indefinitely or until a new image is addressed on the matrix.

Referring to FIG. 1, a typical drive scheme for cholesteric displays of the prior art involves erasing the display to either a planar (bright) or focal conic (dark) texture and then driving the display to its desired brightness with a drive pulse. This figure shows the resultant reflectivity of driving a typical bistable cholesteric display cell of the prior art starting from the planar state of maximum reflectivity, curve 10, as well as from the focal conic state of minimum reflectivity, curve 11. The focal conic state is a forward scattering state that is essentially transparent to the light traveling through it. Each point in curve 10 was achieved by first applying an erase pulse (sometimes referred to as a clearing pulse; see U.S. Pat. No. 5,644,330 as well as later discussion in this document) to drive the display to its highest reflectivity in the planar texture as described in the prior art. Following each erase pulse a 100 ms drive pulse (frequency=250 Hz) is applied to achieve the recorded reflectivity. Each point in curve 11 was likewise achieved by first applying an erase pulse (sometimes referred to as a clearing pulse; see U.S. Pat. No. 5,644,330), however driving the display cell to its darkest (least reflective) focal conic state. Following each erase pulse a 100 ms drive pulse (frequency=250 Hz) is applied to achieve the measured reflectivity recorded as the normalized reflectance. The horizontal axis shows the root mean square (rms) voltage of the applied pulse.

In operation of a prior art cholesteric liquid crystal display having the electrooptic response curve shown in FIG. 1, a pulse with voltage slightly less than or equal to V3, indicated by 13, may be used to address the darkest pixels (i.e., to place pixels desired to be dark into the focal conic state). A voltage>V4, indicated by 12 on curve 10, may be used for addressing bright pixels (i.e., to place pixels desired to be bright into the planar state). Gray scale levels are those levels having a reflectivity between the planar and focal conic states. Gray scale may be achieved by using pulses with values between V3 and V4. Reflectivity of prior art cholesteric displays is highly sensitive to voltage as seen by the extreme steepness of the curve in the gray scale region between V3 and V4 (FIG. 1). Thus, the prior art gray scale drive scheme is sensitive to applied voltage and display imperfections.

Prior art drive pulses may have many forms (see for example U.S. Pat. Nos. 6,268,839 and 5,933,203). Typical but not exhaustive drive pulse forms are dc, ac, and ac with a pause between phases, illustrated in FIGS. 2 and 3. A unipolar dc pulse 21 is illustrated in FIG. 2*a*; an ac pulse 22 in FIG. 2*b* and an ac pulse 23 with a pause between in FIG. 2*c*. It is appreciated also that the ac examples may consist of either single or multiple periods; that is, more than one pulse, in order to satisfy drive frequency requirements of the liquid crystal materials. As shown in FIGS. 3*a*, 3*b* and 3*c*, in some circumstances pulse width modulation between two voltage levels (labeled V0 and V1) may be used to adjust the rms value of the drive pulses as illustration by pulses 31, 32, and 33.

Any of these prior art drive pulses can be used as drive and reduction pulses in the present invention. The width of a unipolar pulse of FIG. 2*a* is the distance between the leading and trailing ends of the pulse; the width of bipolar pulse of FIG. 2*b* is the distance between the leading end of the positive polarity pulse portion and the trailing end of the negative polarity pulse portion; the width of the bipolar pulse of FIG. 2*c* is the same as in FIG. 2*b* but includes the intervening pause at zero voltage between positive and negative polarity pulse portions; the widths of the pulse width modulated pulses of FIGS. 3*a*, 3*b* and 3*c* are the same as in FIGS. 2*a*, 2*b* and 2*c*, respectively.

U.S. Pat. No. 6,133,895 discloses a cumulative drive scheme for a cholesteric liquid crystal display for changing images on the display at a near video rate. This driving procedure takes advantage of the cumulative nature of a cholesteric display as well as its threshold characteristic to address the pixels in a passive matrix with a sequence of pulses of narrow width in the same manner as an regular liquid crystal display (LCD) in the twisted nematic (TN) or super twisted nematic (STN) mode to provide the same video image aesthetic. Because of the higher viscosity of cholesteric liquid crystals video rates are only possible however on small matrices where the number of pixels is limited. FIGS. 4A and 4B of U.S. Pat. No. 6,133,895 show increases in reflectivity and FIGS. 5A and 5B of the patent show decreases in reflectivity, using AC pulses at a constant voltage and 1 ms pulse width.

SUMMARY

The invention achieves uniform gray scale for areas of bistable cholesteric liquid crystal displays that are susceptible to many gray scale non-uniformities or discontinuities. The gray scale discontinuities are found in areas of the display in which blotchiness in gray scale reflectivity is noticeable with the naked eye, for example, for areas of the display bounded by conductive layers that are about 1 cm$^2$ and larger and in particular, at least (2.54 cm)$^2$ or (1.00 in$^2$) (referred to herein as "display areas"). Typically a display area is the entire viewing area of the display, but it can be a portion of a display, such as in the case of a display having a portion with unpatterned conductors and another portion with patterned conductors. In this disclosure, uniform levels of gray in the display area are accomplished by a method of electronically driving different shades of gray using a sequence of voltage reduction pulses. A particular shade of gray is determined by the number of such reduction pulses.

We further disclose an electronically tunable color overlay liquid crystal display referred to in this disclosure as electronic skin that can be placed on anything. Electronic skin is a sheet of material, usually a flexible material, that can be formed into a sleeve or have adhesive on the back to form a sticker of changeable color to be placed on any item the user desires a different color. This invention will allow consumers to individualize anything by adding a personalized changeable color to the item of interest. Several possible items to attach electronic skin to are described. The reflection of the front surface of the electronic skin can be shiny like plastic or can have varied textures to the front surface reflection.

Electronic skin can encompass components of a bistable cholesteric display cell made of stacked layers to create a multitude of colors as described for example in U.S. Pat. Nos. 6,654,080, 6,377,321 and 7,061,559. These patents describe cholesteric displays that can create a full color image that remains on the display without applied power until erased and addressed with a new image. The stacked liquid crystal layers of the electronic skin are in the form of a film or sheet. The entire surface of the display can change from one color to another. The colors of each layer in the electronic skin may be tuned to create a color space of particular interest such as; pink, violet, skin tones on colors matching garments. The color of the layers making up the entire electronic skin may be red, green, and blue or different colors. The electronic skin may be include a triple, double or even single liquid crystal layer if fewer colors are desired (e.g., a single active layer with a color back layer). The electronic skin can be made of flexible substrates such as plastic so that the skin can conform to the surface of the object on which it is laminated. Flexible cholesteric displays are briefly described in the book "Cholesteric Liquid Crystals for Flexible Displays" in *Flexible Flat Panel Displays*, Ed. G. Crawford, (John Wiley & Sons, 2005) J. W. Doane and A. Khan, Chapter 17. The electronic skin is a form of display but may only provide a color without necessarily an image. The electronic skin may be thermoformed to conform to the desired shape and may possess unpatterned electrodes.

In this disclosure, a new drive scheme is described for cholesteric liquid crystal displays. The drive scheme is applicable to glass- or plastic-based displays. Driving the display with the new scheme minimizes the sensitivity of the gray levels to display imperfections and reduces the need for further improvements in display manufacturing processes.

The electronic skin avoids gray scale discontinuities caused by imperfections in the display that may arise by: imperfections in the electrodes; non-uniform cell gap; non-uniform polymer dispersions; non uniform structure of the cholesteric liquid crystal such as caused by non-uniform surface induced alignment or other means. Reduction voltage pulses of narrow width are used to reduce the sensitivity of gray levels so that imperfections in the display are not visible in the gray levels therefore providing a uniform reflective intensity of a Bragg reflective color. In prior art displays having a liquid crystal sandwiched between two substrates, cell gap is the measured distance between the substrates. Such prior art displays normally have electrodes patterned on the inside of each substrate in contact with the liquid crystal layer, the electrodes being extremely thin on the order of angstroms. Prior art substrates of liquid crystal displays are normally made of glass and are very thick in comparison to the very thin liquid crystal layer, which can be on the order of 10 microns or less in thickness. Cell gap is used herein to describe a close approximation of the distance between electrodes. Imperfections in the cell gap spacing are common in the manufacturing of cholesteric displays, and can be created, for example, in the following situations: by substrates that aren't suitably smooth, by substrates that are soft and easily distorted in the manufacturing process or later on (e.g., flexible plastic substrates), by dust particles between the substrates, by application of non-uniform pressure in the sealing of the cells (e.g., compression of glass substrates during roller leveling of the liquid crystal material filled between the substrates), or during curing of droplet dispersions of the liquid crystal material filled in the cell. These imperfections can be particularly troublesome in displays with plastic substrates and can be worse for displays of large area. There can also be imperfections in the conductive layer forming the electrodes. The electrode materials are not perfect conductors and being very thin, a small fraction of a micron thick, are subject to non-uniformities in conductivity. The layer of cholesteric liquid crystal is also subject to variations in the dielectric constant caused by alignment variations in the material sandwiched between the two electrodes or by variation in the polymeric dispersion. Variations in the dielectric constant cause variations in the electric field across the material when a voltage is applied to the electrodes.

Uniform reflective colors are important in multiple color displays in which different colors can be electronically addressed by stacking cholesteric liquid crystal display cells reflecting different colors. Cells in which the cholesteric materials have pitch lengths reflecting the primary colors, red, green and blue, are typically stacked. By gray scale addressing each of such stacked display cells, numerous colors are available on the display with additive color mixing. Uniform gray scale of each of the stacked colors is possible with the instant invention for cases where the displays cells have imperfections.

The instant invention reduces the demands on the manufacturing process in that display cells with any of the above imperfections can be used. This invention substantially lowers the display cost in some applications by enabling use of imperfect display cells but while achieving high quality gray scale color images.

The phrase "uniform gray scale reflectivity in the display area" or the like as used in this disclosure means that no discontinuities in the reflectivity of gray scale are observable with the naked eye anywhere in the display area. Gray scale is defined herein as any level of reflectance of liquid crystal material that is between a maximum level of reflectance of the planar texture and a minimum level of reflectance of the focal conic texture of the material. Each active layer of bistable cholesteric liquid crystal material has a characteristic predetermined color determined by the pitch length of the material. When displays include two or more stacked active layers, the display can exhibit the color of either active layer or an additive mixture of the color of both active layers along with any back color of the light absorbing back layer. Gray scale color used in this disclosure means the color of the display or images on the display produced when one or more of the active layers is at a gray scale level. The terms "bistable cholesteric liquid crystal" mean that once one or more areas of the display have been driven to a desired focal conic texture or planar texture (or gray scale level), the display can reflect the focal conic texture and the planar texture (and any gray scale level) without application of an electric field.

BRIEF DESCRIPTION OF THE DRAWINGS

The patent or application file contains black and white drawings only.

FIG. 2: Typical drive pulses of prior art: (a) DC, (b) AC, (c) AC with a pause between phases;

FIG. 3: Drive pulses of prior art with pulse width modulation: (a) DC, (b) AC, (c) AC with pause;

FIG. 4: Schematic illustration of an electronic skin in a side and exploded view (not to scale);

DETAILED DESCRIPTION OF THE INVENTION

Figure 1:
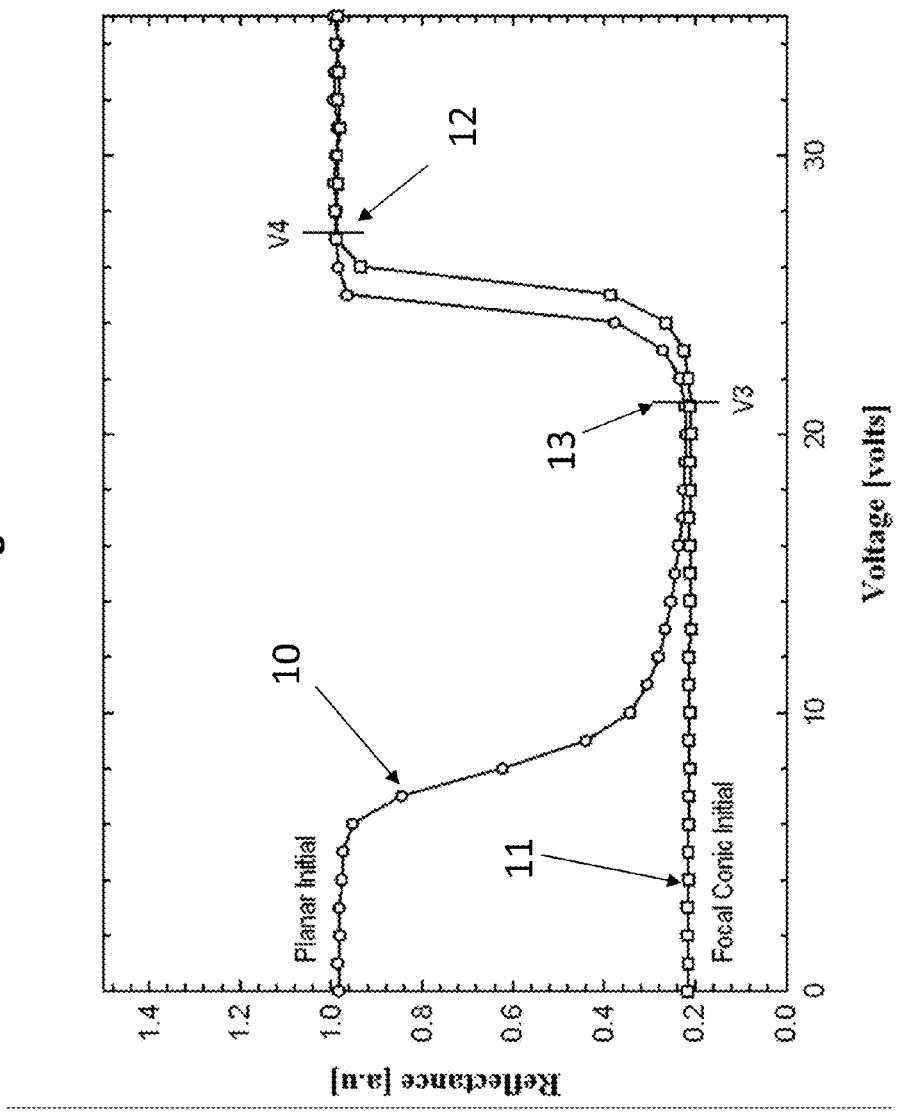
FIG. 1: Electrooptic curves for drive pulses applied to a conventional cholesteric liquid crystal display.

One embodiment of the present invention features electronic skin that includes substrates, electrically conductive layers and a single optically active layer of bistable cholesteric liquid crystal material as illustrated in FIG. 4 which shows a side view 40a and an exploded view 40b. The electronic skin of this embodiment has outer substrates, an upper transparent substrate, 41 and a lower substrate, 42 which may be transparent or opaque. Both substrates each have an electrode layer disposed on their inside surface. One or both of the substrates may be patterned or unpatterned. The illustration of FIG. 4 has patterned electrodes 43 on the upper substrate and unpatterned electrodes 44 on the lower substrate. An active layer 45 is disposed between the two substrates, 41 and 42 and their corresponding electrodes 44 and 43. The active layer is a bistable cholesteric liquid crystal preferably in the form of a polymer dispersion 45 as illustrated. The dispersion may be in the form of cholesteric liquid crystal droplets or the polymer may be a network dispersed within the cholesteric material. The cholesteric material has a pitch length effective to reflect light of a certain color. This color is determined when the display is in the planar texture of maximum reflectance reflecting ambient light (e.g., room lighting). The device has a light absorbing back layer 46, which can be black or any color. Incident light not reflected by the active layer is either totally or partially absorbed by the back layer.

Figure 5:
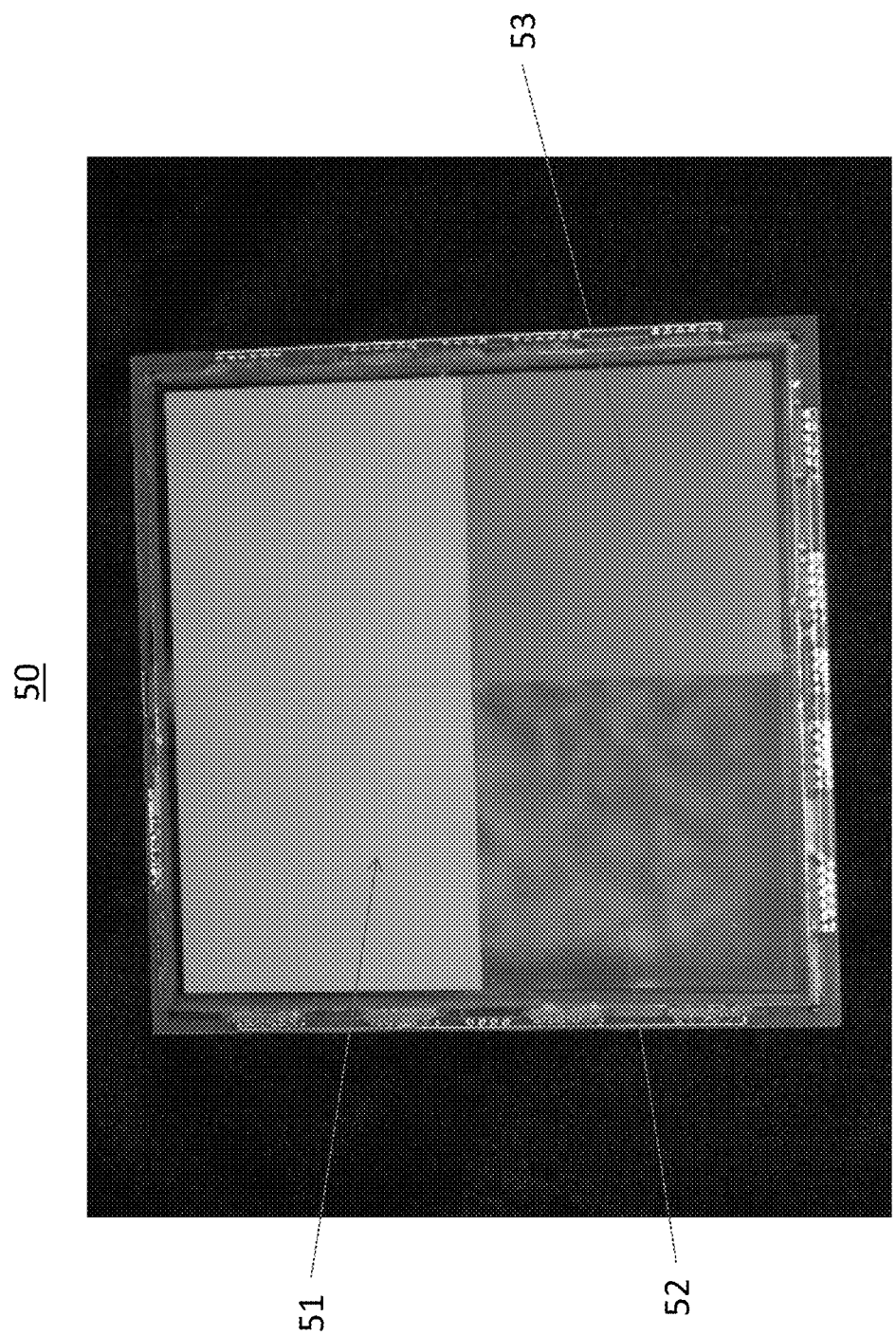
FIG. 5: Photograph of a bistable cholesteric cell illustrating non-uniform and uniform shades of gray relative to the planar texture.

The electronic skin has display areas (regions where the liquid crystal is bounded by the electrodes) that are susceptible to discontinuities in gray scale reflectivity. FIG. 5 shows a photograph 50 of an electronic skin so constructed according to the schematic illustration of FIG. 4. The dimensions, materials and addressing pulses are described in Example 1. Region 51 is the planar texture addressed with an erase pulse of prior art. Region 52 is a region addressed with a gray scale pulse of prior art and clearly shows the non-uniformity or blotchiness of the resulting image.

Once the reduction pulses have been applied to the electrodes in accordance with the invention, the active layer reflects light at a gray scale having uniform reflectivity in the display area as shown in region 53 of FIG. 5. The electronic skin can be electronically switched to display different gray levels and consequently different colors if the back layer is some other color than black. A driver device applies reduction voltage pulses to electrical leads connected to the electrodes of the active layer effective to enable the active layer to reflect light at gray scales having uniform reflectivity in the display areas. The electronic skin exhibits an electronically changeable color that is an additive mixing of the color reflected by the active layer at the various gray scale levels and any color reflected by the back layer. For example, the cholesteric material may reflect green and the back layer red. The resulting color perceived depends on the level of reflectivity of the green layer.

The electronic skin has uniform gray scale reflectivity by applying one or a series of voltage reduction pulses to the conductive layers, creating an electric field across the active layer. Each reduction pulse partially reduces the reflectivity of the active layer. The instant invention reduces the sensitivity of reflectance to voltage by placing the active layer in a desired gray scale level using short or narrow reduction drive pulses. The pulses are sufficiently short to reduce the electronic skin's reflectance sensitivity to such cell imperfections as caused by variations in the cell gap thickness, variations in electrode conductivity, or variations in the cholesteric or cholesteric dispersion material.

Figure 6:
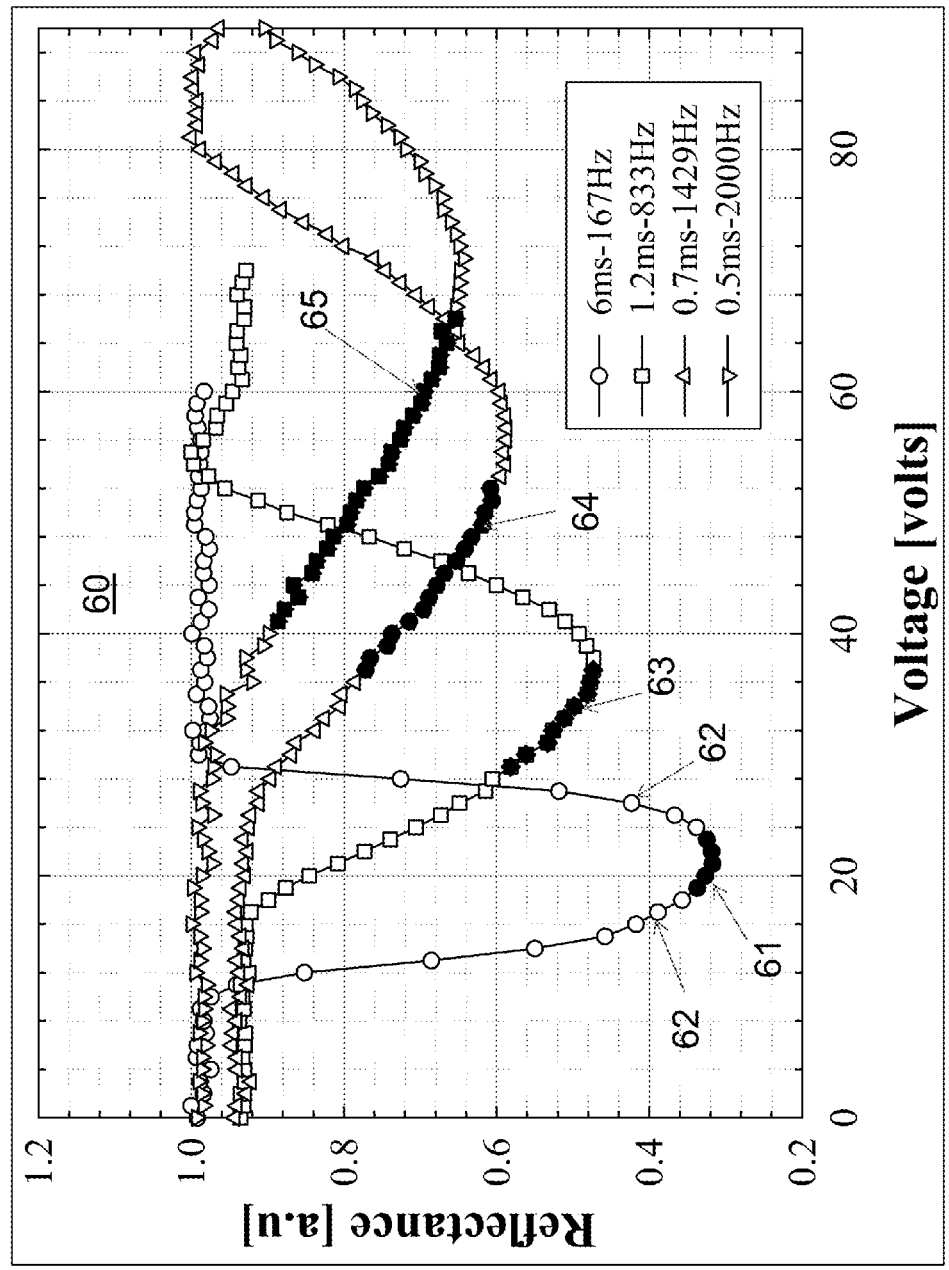
FIG. 6: Electro-optic response curves produced using narrow reduction pulses of various pulse widths in the present invention yielding uniform (solid data points) and non-uniform (open data points) gray scale reflectivities for an electronic skin made of glass substrates.

FIG. 6 shows an experimental plot 60 of the response of the reflectivity of the liquid crystal material to short reduction pulses as described in Example 2. Four response curves are shown corresponding to each of four different narrow pulse-widths. These pulse widths are substantially smaller than the 100 ms pulse width of FIG. 1. As described in Example 2, each of the points in plot 60 in FIG. 6 were made by first applying an erase pulse, which erased the active layer to the planar texture. The erase pulse was then followed by a single pulse of narrow pulse width. Experimental plots using four different pulse widths: 6 ms-167 Hz (circle data points); 1.2 ms-833 Hz (square data points); 0.7 ms-1429 Hz (upright triangle data points) and 0.5 ms-2000 Hz (inverted triangle data points) are shown in plot 60. In each of the four experimental plots the data points were made by applying an erase pulse, which erased the active layer to the planar texture, followed by applying reduction pulses of narrow pulse width indicated above and in FIG. 6.

A desirable feature of these curves is that each curve has portions on the curve (uniformity regions) where the resultant reflectivity is less sensitive to the pulse voltage and thus, less sensitive to variations in the voltage due to display imperfections. The uniformity portions or regions of each curve where the resultant reflectivity is uniform over the entire skin surface is indicated by solid points on the curve whereas those portions of the curve that result in non-uniform or blotchy reflectivity are indicated by open points. It is also apparent by observing the minimum values of the reflectance of each curve that it is not possible to transition fully from the planar state to the darkest focal conic state in a single pulse as compared to a 100 ms pulse, see voltage V3, 13 of FIG. 1. The curve minimums of FIG. 6 do not achieve a minimum reflectance value of 0.2 arbitrary units (a.u.) that is achieved by curve 11 of FIG. 1 because the widths of the pulse are too narrow. Each of the narrow pulses drive the display partially towards reduced reflectivity (darker gray level); however, they do not achieve the darkest level of the focal conic state no matter what voltage is used. However, if reduction pulses are later discovered that do achieve the darkest level of the focal conic state, this should not be used to limit the invention. It will be shown later that because of the cumulative nature of bistable cholesteric materials multiple pulses can be used to reduce reflectivity even further.

The reduction in reflectivity caused by a pulse can be controlled by adjusting the width and the voltage of the pulses. We now return to the curve of FIG. 6 that shows the effect on the electrooptic response curve on reflectance using pulses of 6 ms pulse widths at various voltages from initial state of the planar texture obtained by first applying an erase pulse. It is apparent that the reflectivity passes through a minimum but does not achieve the low reflectance of the focal conic state that was achieved in FIG. 1. After reaching the minimum, the reflectivity rises and achieves the value of the planar texture at higher voltages. One of the inventive features of this disclosure is that a small region of this curve, indicated by the solid data points 61, yields a uniform reflectance over the display or electronic skin (i.e., across the entire display area) whereas the other open data points 62 on the curve yield a non-uniform reflectivity. Turning now to the curve of FIG. 6 obtained with 1.2 ms pulses it is apparent that that curve also passes through a minimum; however, the minimum value of reflectivity achieved is not as low as that of the 6 ms pulse. It is to be further noted that the region of the curve indicated by solid data points 63 covers a larger voltage range than that of the 6 ms pulse. Likewise the solid data points of the 0.7 ms width pulses 64 cover a larger voltage range but do not reduce the reflectivity as much as the 6 ms or 1.2 ms width pulses. The solid data points of the 0.5 ms width pulses 65 cover the largest voltage range of all pulse widths indicated but provide the least reduction in the reflectivity, It is to be further noted that the solid data points 61, 63, 64, and 65 for the 6 ms, 1.2 ms, 0.7 ms and the 0.5 ms pulse widths, respectively, all are on regions of the curve with a small slope. These are regions of the curves where the reflectance is least sensitive to changes in the voltage. The reduction pulses associated with regions 61, 63, 64 and 65 are insensitive to the voltage level differences provided by imperfections in the electronic skin from which they were achieved. It is shown in Example 3 that one can determine the magnitude of the imperfections from these regions of the curve. Example 3 uses the solid data point region 61 for the 6 ms pulse width to measure the variation in cell gap of the electronic skin from which the data were obtained. A value of 0.35 µm for the maximum cell gap variation compares favorably with a value of ~0.4 µm expected from estimated maximum variation of the surface of the unpolished glass used to make the electronic skin.

For the purposes of this invention a reduction pulse is defined as a pulse that achieves gray scale in which the pulse width is such that a single reduction pulse does not reduce the reflectance to the minimum reflectance of the focal conic state of the display for any pulse voltage. For example, the minimum of the reflectance of FIG. 1 is 0.2 a.u. In most cases, such as that of Example 2, it is not necessary to even be very close to that minimum value because more than one and often several pulses are used, as will be demonstrated below, to achieve a desired gray level. Not all reduction pulses produce uniform gray levels. The range of pulse voltages and widths that do provide uniform gray levels depend upon the imperfections in the cell such as the degree of variation in cell gap spacing of the electronic skin device. As noted in the discussion of FIG. 6 of Example 2, the regions of uniform gray level (solid points) have the following properties:

1) Occur at slopes on the voltage response curve where the curve approaches its minimum value. This is believed to be because the minimum value is the portion of the curve least sensitive to imperfections in the electronic skin.

2) All terminate on the left side of the voltage response curves at about the same slope for curves obtained with different reduction pulse widths. The point of termination is where the pulse widths become sensitive to the skin imperfections. The termination points will be different for electronic skins with different imperfections and are best determined by experiment which can be easily carried out by one of ordinary skill in the art in view of this disclosure without undue burden.

3) Extend over a larger voltage scale at smaller reduction pulse widths. Smaller pulse widths sample a larger range of small slopes on the voltage reductions curve. For this reason, small pulse widths are often desired in obtaining uniform gray levels.

4) Provide smaller reductions in gray level at smaller reduction pulse widths. As will be shown immediately below, small pulse reductions are not an inconvenience as a series or sequence of small pulses are cumulative in their reduction effect.

Figure 7:
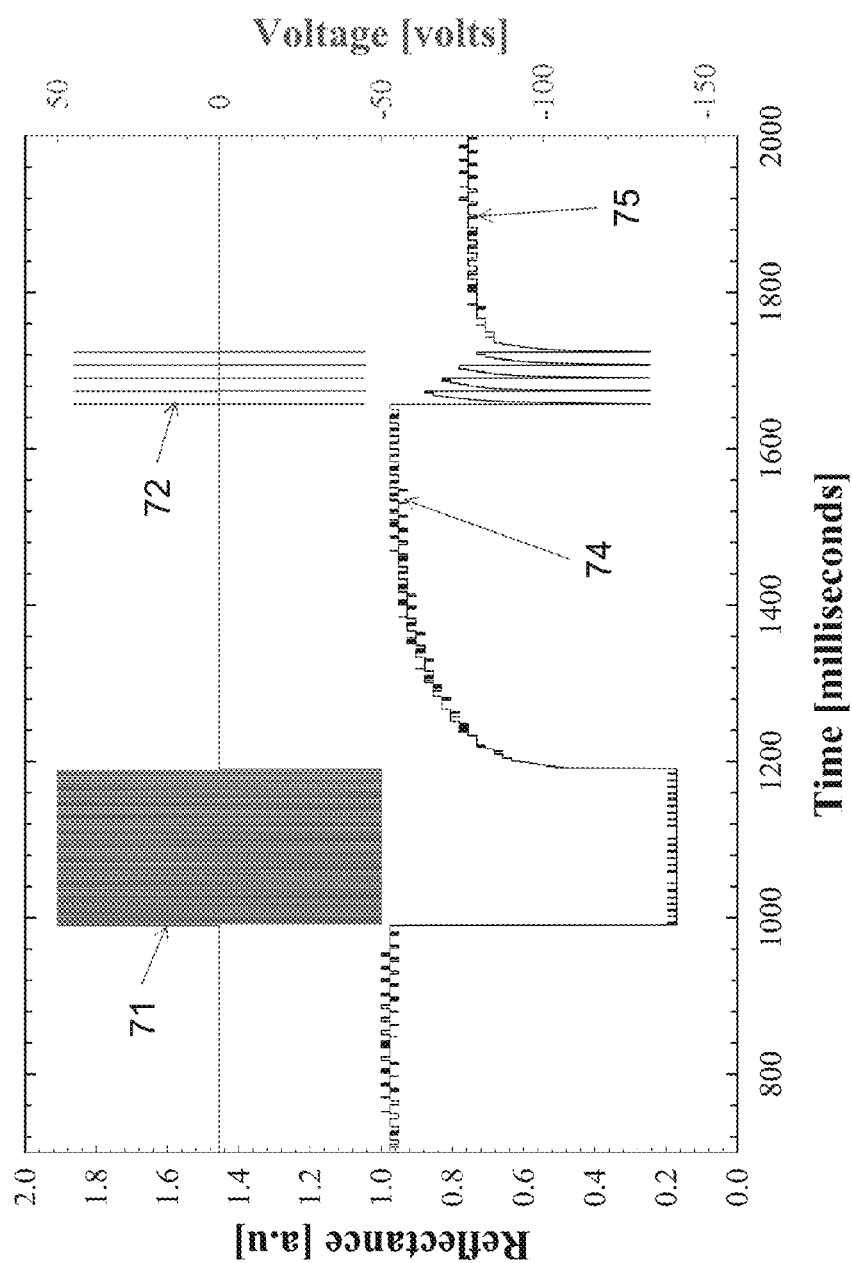
FIG. 7: Figure used in Example 4 to demonstrate the cumulative nature of reduction pulses.

One or more pulses in succession at the same voltage can be used to achieve each gray level step reduction. This is because of the cumulative nature of bistable cholesteric liquid crystal displays (see U.S. Pat. No. 6,133,895). The cholesteric material possesses a memory such that a gray level following a pulse is not only retained by the pulse but that a second pulse adds to the memory to advance the gray level in a cumulative fashion. FIG. 7 illustrates the use of five ac reduction pulses 72 following an erase pulse 71 to drive to a midlevel gray. The reflectance 74 from the erase pulse 71 and the reflectance 75 from the reduction pulses 72 are shown on the left side of the FIG. 7 graph whereas the voltages for the erase and reduction pulses are shown on the right. Note that the planar erase sequence resets the display to a bright state from any gray level state.

Reduction in brightness does not necessarily require a planar erase sequence; they can be achieved by a sequence of reduction pulses which reduce the brightness to the desired gray level based on the initial level. Here, the drive waveforms depend on the relationship between the initial gray level and final gray level state.

Figure 8:
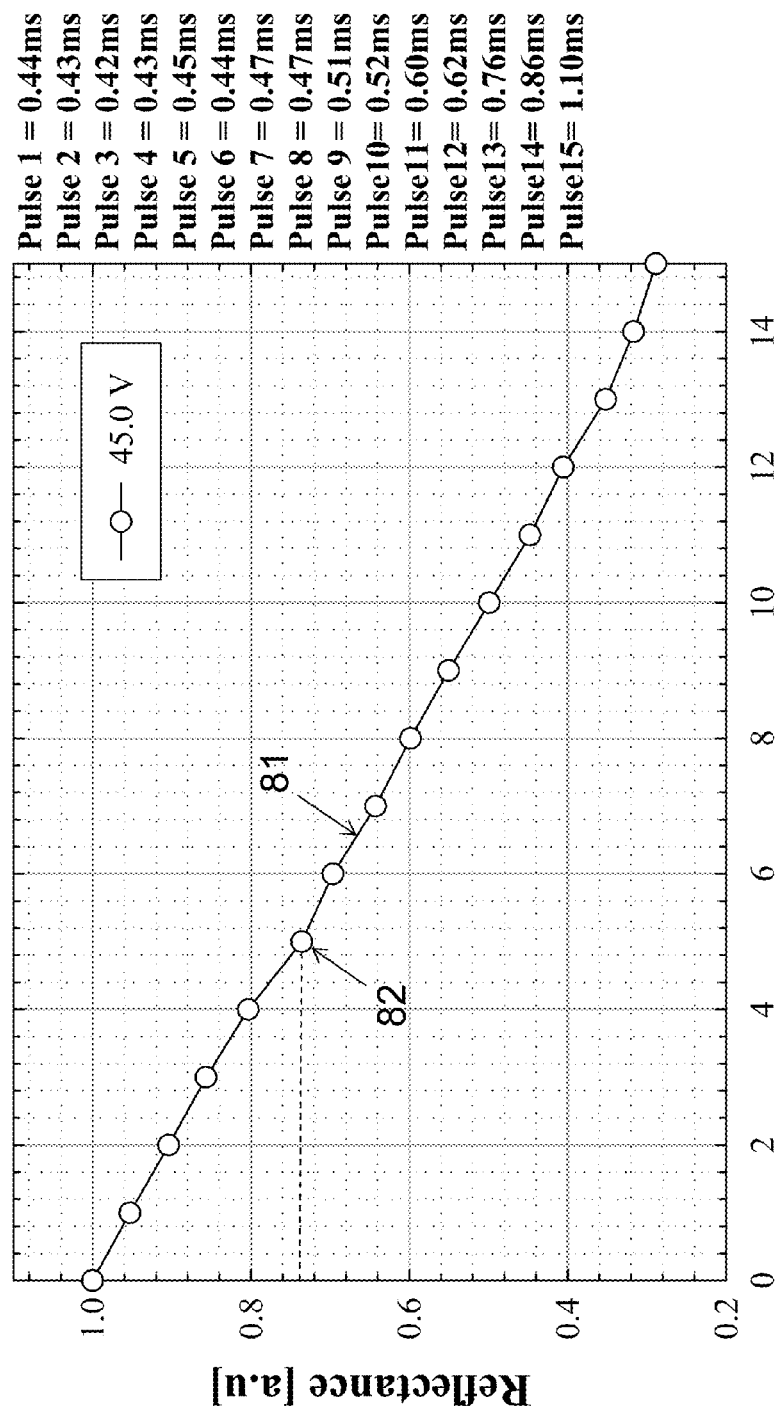
FIG. 8: Figure of Example 5 showing plot of 16 levels of uniform reflectance obtained by reduction pulses.

The invention can produce one desired gray level reduction for each pulse. If pulses of fixed amplitude are used, the pulse width of each successive pulse may be varied if desired so as to achieve the desired level of gray for that pulse. Example 5 demonstrates the use of 15 reduction pulses to create 16 uniform reflectance levels (levels at pulses numbered 1 through 15 being gray scale levels) where each level of gray corresponds to a particular pulse number. An experimentally derived plot of gray scale between the planar and focal conic textures of Example 5 is shown in FIG. 8. The level of reflectance of each gray scale level is arbitrarily chosen. One would specify a desired number of reflectance levels from the maximum reflectance (1.0 a.u.) toward the lowest reflectance (above 0.2 a.u.), which here was 16 reflectance levels in the sequential series. Then each gray scale (at reduction pulses numbered 1-15) has about $\frac{1}{16}$ of the overall reflectivity change of the series. That is, each gray level can be equally spaced with regard to the change in reflectance achieved from the previous reflectance level. The reflectance of a cell, curve 81, for 16 reflectance levels driven first by a planar erase pulse, followed by a pause, and then from zero to fifteen reduction pulses are applied wherein each pulse begins 16.7 ms (60 Hz frequency) after the previous pulse begins. Each pulse decreases the reflectance by one gray level in this figure, so that a desired gray level may be created by driving only the corresponding number of reduction pulses. In FIG. 8 for example, a "$5^{th}$ gray level", 82, yields a reflectance value of 0.73 a.u. as achieved by applying 5 pulses, following the erase pulse that initializes the active layer in the planar state. In Example 5, the reduction pulses all have the same voltage; however, the widths are adjusted to create equal gray scale reductions. The pulse widths began short and trended towards longer values as reflectance decreased. The pulse voltage was determined such that pulse widths yielded a uniform gray level. It was found however that it was not critical if the last one or two pulses be in the range of uniform gray as indicated by FIG. 6 since a sequence of reduction pulses (more than one reduction pulse) tends to extend the voltage range of these curves; that is, the data points of FIG. 6 were made using only one reduction pulse and more than one reduction pulse tends to extend the range of solid data points. Example 5 further shows that eight levels of uniform reflectance (seven reduction pulses) (FIG. 9) as well as four levels of uniform reflectance (three reduction pulses) (FIG. 10) were also possible in the particular bistable cholesteric cell used in the experiment.

The voltage of a pulse may also be varied to tune the reduction in brightness caused by the pulse. However, relatively higher voltages are required to increase brightness if the pulse widths are too short. Lower planar erase voltages may be used with longer pulses in a manner known in the art to reset the display to the maximally bright planar texture. In the preferred embodiment of the instant invention, the display is driven first with a planar erase sequence, a pause of variable length to permit the LC to relax and then a sequence of reduction pulses which reduce the brightness to a desired gray level. A pulse frequency of 60 Hz is desirable to eliminate flicker and also to eliminate beat frequencies visible when the display is viewed under ac room light sources. The reduction pulse scheme can also be applied to a passively driven matrix consisting of row electrodes on one substrate and the orthogonal column electrodes on the other substrate.

The greatest flexibility in driving comes if both voltage and reduction pulse width may be tuned. Consider the reduction pulse curves in FIG. 6. If voltage may be varied, a single 0.5 ms reduction pulse can produce uniform gray levels in the range of ~0.9 a.u. to ~0.64 a.u. Likewise, a single 0.7 ms pulse can produce uniform grays over the range ~0.78 a.u. to ~0.6 a.u., and a single 1.2 ms reduction pulse can produce uniform grays over the range ~0.6 a.u. to ~0.48 a.u.

Thus, any given reflectance between ~0.9 a.u. and ~0.48 a.u. may be driven from planar with a single reduction pulse by selecting the appropriate pulse width to operate on one of these three curves and adjusting voltage accordingly. The inclusion of even more curves (pulse widths) should permit uniform gray levels over the full reflectivity range, where each change in gray level is achieved by applying a single reduction pulse (or more than one reduction pulse) of appropriate voltage and pulse width. For example, one can draw a "uniformity line" that intersects all of the uniformity regions (dark datapoints) of the pulse width curves of FIG. 6; choose a series of gray scale levels; and identify intersection points where each of the gray scale levels intersects the uniformity line, wherein the gray scale reduction pulses comprise pulse widths and voltages on or near each of the intersection points. That is, one would carry out the step of selecting voltages and pulse widths which, based on the uniformity regions of the curves, will produce the gray scale reduction pulses that produce the gray scale levels in the series.

Figure 11:
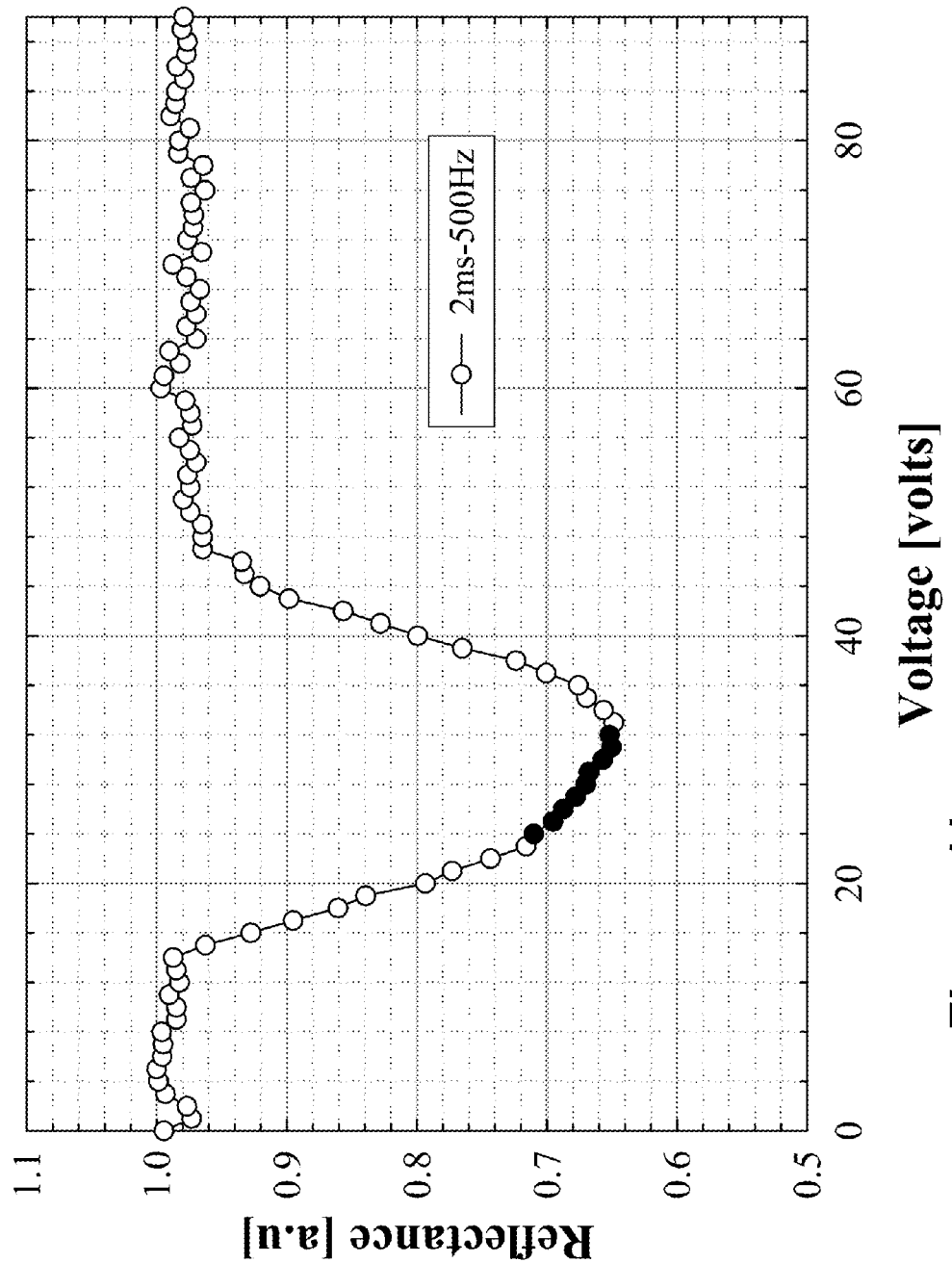
FIG. 11: Figure of Example 6 showing the electrooptic response curve for reduction pulses yielding uniform (solid data points) and non-uniform (open data points) reflectivities for an electronic skin made of plastic substrates.

Electronic skins of principal interest are those that are made of flexible plastic substrates. It is of interest to examine the use of reduction pulses for achieving uniform gray levels in such skins where the uniformity might be expected to be a larger factor than for glass. FIG. 11 shows the electrooptic response curve for an electronic skin with flexible plastic substrates. The curve was obtained experimentally for a flexible plastic electronic skin as described in Example 6. Each point on the curve shows the reflectance versus the voltage of a single reduction pulse at a constant width of 2 ms. Each reduction pulse was preceded by a planar erase pulse. The solid points on the curve indicate those pulses that yield a uniform gray level. The open data points are those that yield a non-uniform gray level. The solid data points on the curve were analyzed similar to that of Example 3 to determine the variation in cell gap thickness for the electronic skin made of flexible plastic substrates. The analysis indicated a variation of ~0.6 μm slightly larger than that obtained for the unpolished glass substrates of Example 3; however not out of range of the experimental error of being the same.

Figure 12:
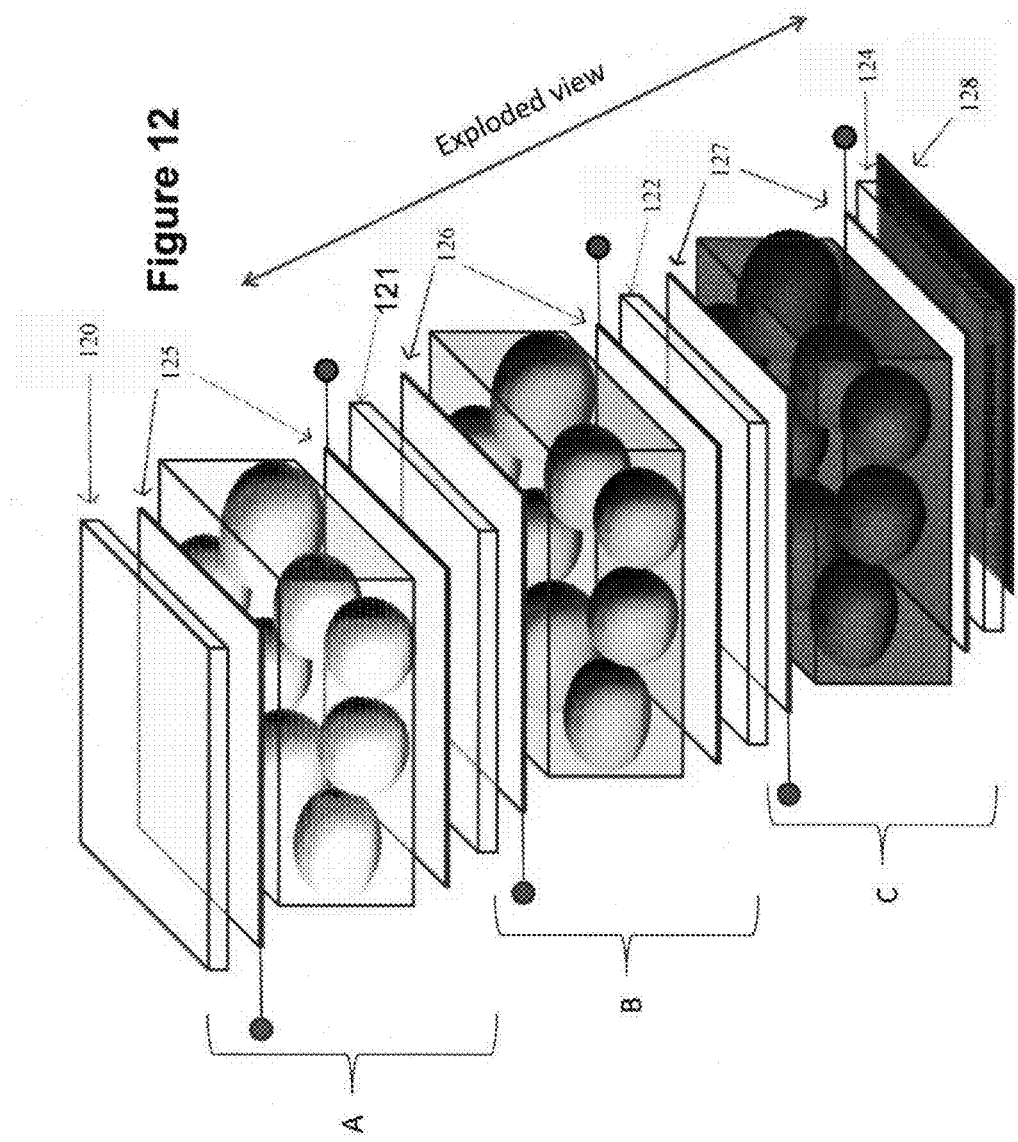
FIG. 12: Schematic illustration of a stacked full-color electronic skin in exploded view (not to scale) wherein Cells A, B and C are blue-reflecting, green-reflecting and red-reflecting, respectively.

In a second embodiment shown in FIG. 12 the electronic skin includes two or three layers of cholesteric liquid crystal stacked over each other. The display can include one or more substrates. One of these substrates can form an outer surface of the electronic skin and one or more internal substrates can be located between adjacent active layers. The other outer surface of the electronic skin can be a transparent polymer substrate or a protective layer coated over the upper electrode (see for example U.S. Pat. No. 7,170,481) then applied to an article; the other outer side of the electronic skin might be attached to a surface of the article with or without an intervening substrate.

A preferred embodiment of the electronic skin is illustrated in FIG. 12 consisting of stacked cells, A, B, and C in which cells A and B share the same substrate 121 and cell B and C share the same substrate 122. The electronic skin might include two substrates between adjacent active layers (in the case of both the double and triple stack displays) with each substrate having an outer electrode just for one active layer (an index matching material being disposed between and matching the index of refraction of the two substrates). The electronic skin may also be one in which all of the layers including the electrodes, active cholesteric liquid crystal dispersions and substrates are coated as for example in U.S. Pat. No. 7,170,481. The electronic skin shown includes three stacked active layers with electrically conductive layers 125, 126 and 127 flanking (disposed on either side of) each of the active layers. The electronic skin includes upper 120 and lower substrates 124. Upper and lower cells A and C each include two substrates, a liquid crystal layer and opposing electrodes on the sides of it; and intermediate cell B includes a substrate from each of the upper and lower cells, a liquid crystal layer and opposing electrodes on the sides of it. A light absorbing back layer 128 is disposed at the back of the electronic skin. The back layer is black or any color as described above. Preferred reflective colors of the three cells are red, green and blue in any order. Electrical leads are connected to each electrode layer. The electrodes can be in the form of patterned row and column electrodes defining separate display segments, the electrodes of the display can be unpatterned, or both.

The electrodes used on the substrates can be solution coated conducting polymer, conducting carbon, silver, carbon nanotubes, or the electrodes can consist of vapor deposited materials (e.g., indium tin oxide, indium tin zinc oxide), combinations of these materials or other electrically conductive materials. The substrates can be formed of rigid or flexible glass or polymer (e.g., PET, PC, cyclic olefins, or PEN polymers). The back coating can consist of black or any color paint or absorbing dye that is applied in a number of techniques such as spraying, screen printing, ink jet printing, or other application technique.

The electronic skin can be flat, curved, or conformed to a three-dimensional curved surface. The electronic skin can be simply bent curved by flexing the film or it can be thermoformed (or created by another means) to an arbitrary shape. The electronic skin can be thermoformed with standard thermoforming techniques whereby a thermoforming mold is built of the desired shape, the mold is heated, and then the electronic skin is placed in the mold under temperature. After the mold is cooled the electronic skin is removed. The temperature required for thermoforming is the glass transition temperature of the substrates of the electronic skin. Electronic skins can be thermoformed to curvatures that would otherwise cause the ChLC layer to delaminate.

Electronic skin can include different color cholesteric liquid crystal, ChLC, layers, such as different dispersions of ChLC in a polymer matrix formed by a polymerization induced phase separation, PIPS, process (as disclosed in U.S. Pat. No. 7,351,506), thermally induced phase separation, TIPS, process or solvent induced phase separation, SIPS, process (as disclosed in U.S. Pat. No. 4,685,771).

Figure 13:
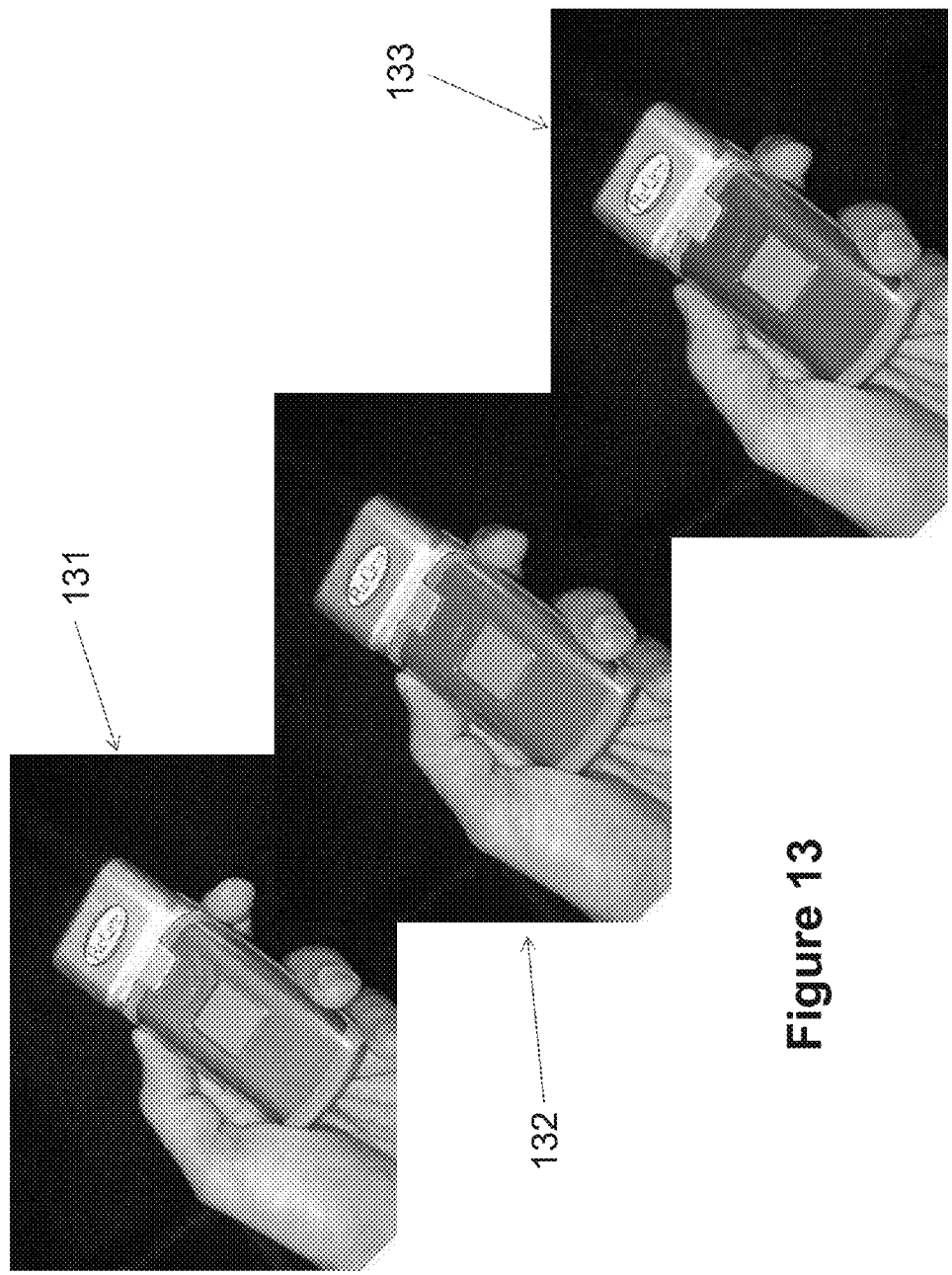
FIG. 13: Color photos of electronic skin on a cell phone housing wherein 131, 132 and 133 depict a cell phone including a green, blue or red electronic skin, respectively.

FIG. 13 shows a color photograph of cell phone housing with an electronic skin of the present invention. The electronic skin was made with a triple stack consisting of the primary colors red, green and blue. The cholesteric material used in the prototype is of a PIPS type of U.S. Pat. No. 7,351,506. Between each pair of adjacent liquid crystal layers of the triple stack display was an internal substrate of flexible PET polymer less than 1 mil in thickness having shared electrodes. The red, green and blue colors for the phone were achieved by addressing the electronic skin with drive electronics separate from the phone. However, one of ordinary skill in the art can apply appropriate erase and reduction voltage pulses to the electronic skin using the cell phone electronics and power. Using uniform gray levels the color of the electronic skin can be electronically tuned to a desired color.

Full-color, single substrate flexible displays that can be modified to form the inventive electronic skin are described U.S. Pat. No. 7,170,481 using emulsion materials or by using polymerization induced phase separation (PIPS) materials. Electronic skins can also be made on substrates that can be prepared and released from a release layer (U.S. Pat. Nos. 7,796,103, 7,773,064, and 7,236,151). Electronic skins may be prepared by emulsions on a transparent substrate such that after lamination the skin is viewed through the substrate similar to processes described in U.S. Pat. Nos. 6,359,673 and 6,788,362. Electronic skins may also be prepared by coating the emulsion or phase separated materials directly on the device itself where the device surface is the substrate upon which other coatings such as the electrodes are also coated.

Electronic articles or devices that can include or be composed of electronic skin of the invention and can be changed to any desired color, are described in the following, non-limiting list: cell phone, laptop, computer, computer monitor, computer mouse, computer keyboard, television, I-pod, MP3 player, PDA, video game controller, stereo, radio, CD player, appliance, toy, headphones, clock, handheld electronic devices and combinations thereof. Further such articles include: key ring accessory, shoe, purse, backpack, briefcase, computer case, computer covering, jewelry, watch, bottle, bottle lid, clothing, clothing embellishment, furniture, furniture embellishment, mobile entertainment case.

The article can include a support surface on which the electronic skin is attached or the entire article or portion thereof can be composed of the electronic skin. The support surface can have any shape. The support surface can include a 3 dimensional contour in which case any outer support layers and substrates of the electronic skin are formed of a polymer material enabling the electronic skin to be conformable to the contour of the support surface. The electronic skin can be drapable, as in a drapable sheath or covering, or a fabric, textile, paper or polymeric sheet composing the electronic skin, the components of the electronic skin being constructed in a manner disclosed in U.S. Pat. No. 7,170,481 as would be apparent to one of ordinary skill in the art in view of this disclosure. Examples of articles composed partly or entirely of the electronic skin are drapable sheaths such as laptop covers and fabric made of the electronic skin as where the fabric is a substrate of the skin.

The invention will now be described by reference to the following example presented to illustrate, rather than limit, the invention.

Example 1

Levels of gray are levels of brightness as they are reduced from the maximum brightness exhibited by the planar texture of a particular electronic skin. In order to demonstrate the difference between uniform and non-uniform levels of gray, a bistable cholesteric cell illustrated in FIG. 4 was constructed. The glass cell was constructed using two 5.5×5.5 inch glass substrates, each 0.55 mm thick with ITO transparent conductors. The glass substrates were of unpolished glass exhibiting an expected roughness and not a perfectly smooth surface. The cell gap spacing was set by the use of glass spacers with an average size of 9 microns. However, because of the roughness of the substrates the cell gap was expected to have imperfections in cell gap thickness by as much as 0.4 µm which is typical for the use of unpolished glass. The glass cell was filled with a cholesteric liquid crystal KLC-23, a Kent Displays, Inc. proprietary mixture of a nematic liquid crystal with a large dielectric anisotropy to yield a low voltage response and chiral additives at a sufficient concentration to yield a Bragg reflection of approximately 530 nm. (This example is not sensitive to the type of material used. Non-proprietary nematic mixtures such a E-44 combined with BL061 (a cholesteric mixture composed unknown chiral additives and E44), both obtained from EMD Chemicals, tuned to same Bragg reflective wavelength could be used as a suitable material; however, the operating pulse voltages and widths would be different to achieve the same results.) The conducting electrodes of the cell were connected to a bipolar power supply (by LC Technologies, Inc.) that outputted a waveform of voltage pulses specified by a polynomial waveform synthesizer (Model 2020 by ANALOGIC) that was programmed through the computer program, LabVIEW.

Cell 50 of FIG. 5 shows the display with the top half erased to the planar texture (area 51) with a 250 Hz AC erase pulse of amplitude of 50 V and pulse width of 100 ms. Area 52 is first erased in the same manner with a 50V, 250 Hz, 100 ms wide pulse then followed 300 ms later with a 41.5 V, 250 Hz AC pulse of 100 ms in width driving the pixel to an intermediate gray level. The non-uniformity or blotchy appearance of the gray level in area 52 is clearly evident. Area 53 is driven to an intermediate gray level with reduction pulses of the instant invention. Area 53 is first erased to the planar texture with a 250 Hz AC erase pulse of an amplitude of 50 V and pulse width of 100 ms then 300 ms later driven to the intermediate gray level 53 with a sequence of reduction pulses. The reduction pulse sequence consisted of thirteen 45V, one cycle bipolar pulses of varying pulse widths with a period or spacing of 16.7 ms. The widths of the reduction pulses (in ms) to achieve the gray level shown were: 0.42, 0.35, 0.36, 0.40, 0.40, 0.40, 0.45, 045, 0.50, 0.50, 0.55, 0.57, 0.75, respectively. The gray level of area 53 is clearly uniform, and completely void of the blemishes shown in area 52.

Example 2

Electrooptic response curves which are a plot of the reflectance of the cell versus the rms voltage of a pulse are experimentally achieved for a bistable cholesteric cell for various pulse widths as shown in FIG. 6. While acquiring each of the data points, the cell was observed visually with the eye to determine if the cell exhibited a uniform or non-uniform gray level. The glass cell was constructed using two 2×2 inch glass substrates, each 1.0 mm thick with ITO transparent conductors. The glass substrates were of unpolished glass exhibiting an expected roughness and not a perfectly smooth surface. The cell gap spacing was set by the use of glass spacers with an average size of 5.0 microns. However, because of the roughness of the substrates the cell gap was expected to have imperfections in cell gap thickness by as much as 0.4 µm expected forunpolished glass. The glass cell was filled with the same cholesteric liquid crystal KLC-23, (Kent Displays, Inc.) as used in Example 1. Conductive leads were connected to the upper and lower ITO electrodes of the cell which were then connected to a bipolar power supply (by LC Technologies, Inc.) driven by a polynomial waveform synthesizer (Model 2020 by ANALOGIC) to provide voltage pulses to the cell. The optical response was measured by use of a 300 W Xenon Arc Lamp (Model 6258 by ORIEL Instruments) that emits a white light into a grating monochromator (Model 77250 by ORIEL Instruments). The monochromator divides the white light into individual wavelengths, and transmits the wavelength specified. The light is then incident (normal) to the cell, and the light that is reflected at 45° is measured by a photodetector (Model #PDAMP-4 by LC Technologies, Inc.) The electro-optical response is determined by measuring the 45° reflectance of the display after applying a pulse sequence consisting of an erase pulse followed after a pause by a reduction pulse. The reflectance is the measured light intensity normalized to a value of one at its maximum recorded value from the planar texture. With this definition of reflectance the units are given as arbitrary units (a.u). The reflectance was measured after waiting several seconds to allow time for the liquid crystal to relax to its equilibrium state. Before applying the next pulse sequence to obtain the next data point the cell was visually inspected to determine whether the gray level was uniform or non-uniform.

Each data point on the response curves of FIG. 6 was obtained with a planar erase pulse made up of a 50V ac square wave of 250 Hz pulse of 200 ms in width then applying a narrow reduction pulse after a pause of 16.7 ms to drive the cell into a gray level. The pulse widths of the reduction pulses were chosen substantially smaller that the erase pulse width (200 ms erasing pulse for the combined plurality of pulses having the width of the pulse 71 on the x axis in FIG. 7) such that a single reduction pulse never achieved the minimum reflectance of the focal conic state. The reduction pulses used in obtaining FIG. 6 were each single square bipolar pulse of pulse widths: 6 ms (circle data points); 1.2 ms (square data points); 0.7 ms (upright triangle data points) and 0.5 ms (inverted triangle data points). The open data points in FIG. 6 are those data points where the gray level of the cell was observed to be non-uniform whereas the solid data points are those where the cell was observed to be uniform. As noted in the text, the regions of uniform gray level (solid points): 1) occur where the slope of the curve is small; 2) all terminate on the left side of the curves at about the same slope; 3) extend over a larger range of voltages for smaller reduction pulse widths; 4) provide smaller reductions in gray level at smaller reduction pulse widths.

Example 3

In this example, while not wanting to be bound by theory, we estimated the variation of the cell gap distance from the data of FIG. 6 based on the assumption it is due to the variation in the surface roughness of the unpolished glass surface of the substrates from which the cell was formed. The premise of this example is that the slopes of the curves in FIG. 6 determine the sensitivity of gray levels to the imperfections in the bistable cholesteric cell. This is supported by the observation that the solid data points (points exhibiting uniform gray levels) all terminate on the left side of each curve at about the same slope. This value is given by the ratio $(\Delta R/\Delta V)_{max}$ where $\Delta R$ is the change in Reflectance and $\Delta V$ is the corresponding change in Voltage at a point on the curve. From the curves it is found that $(\Delta R/\Delta V)_{max} \approx 0.02$. If the non-uniformity is due to variations in cell gap then one obtains:

$$(\Delta R/\Delta V)_{max} = (\Delta R)/E(\Delta d) \approx 0.02. \quad \text{Eq. 1}$$

Where E is the electric field and $\Delta d$ is the variation in cell gap spacing d. Solving:

$$(\Delta d)_{max} \approx (\Delta R)_{max}/E(0.02) \quad \text{Eq. 2}$$

Eq. 2 states that for a cell gap variation $(\Delta d)_{max}$, there is a corresponding variation in $(\Delta R)_{max}$ that is insensitive to this variation. One can get that variation in $(\Delta R)_{max}$ from one of the electrooptic response curves of FIG. 6 and seeing where on this curve the uniform gray occurs. For this purpose, we choose the plot for the 6 ms pulse width (reason to be discussed later). We see that uniform gray occurs at a field nearly symmetric around its minimum value of about $E \approx 22V/5$ $\mu m = 4.3$ V/$\mu m$. We further see that at this field $(\Delta R)_{max} \approx 0.03$. This is then deemed to be the variation in $(\Delta R)_{max}$ that is insensitive to $(\Delta d)_{max}$ for which one obtains: $(\Delta d)_{max} \approx 0.03/4.3 (0.02) \approx 0.35$ $\mu m$. This appears comparable with the estimated roughness of the unpolished glass cell, $\sim 0.2$ $\mu m$, in which case the cell gap variation would be $\sim 0.4$ $\mu m$.

The plot with the largest pulse width, 6 ms was chosen for this calculation because the effect of the response times of the liquid crystal was ignored in the calculations. It may be reasonable to expect that the shorter pulse widths are not as accurate since the liquid crystalline material does not have time to respond fully to the pulse. It is expected that the curves should be symmetric about the minimum and they are not and get more asymmetric as the pulse width gets narrower which is perhaps another result of response of the liquid crystal being too slow to fully respond to the applied pulse as well as the cholesteric material being partially driven into the homeotropic (untwisted nematic structure) texture at the higher voltages.

Example 4

In order to demonstrate the use of cumulative pulses a cell was constructed identical to that of Example 2 except that the cell was filled with a cholesteric liquid crystal KLC-22 a Kent Displays, Inc. mixture with a Bragg reflection of approximately 530 nm. As indicated earlier, this example is not sensitive to the type of material used and commercial materials from EMD Chemicals such as nematic mixtures such as E-44 with chiral additive BL061 can be obtained with the same results; however, the operating pulse voltages and widths would be different to achieve the same results. The electrodes of the sample were connected to the same voltage source as in Example 2 and in addition connected to an oscilloscope to observe the pulse shapes. The reflectance was measured as in Example 2. The results shown in FIG. 7 are for a pulse sequence consisting of a 250 Hz, 200 ms, 50.0 volt erase pulse followed after a pause of 450 ms with a series of 45 volt single square wave reduction pulses of: 0.42 ms, 0.35 ms, 0.36 ms, 0.40 ms, and 0.40 ms pulse widths, respectively, with a pause in between each reduction pulse such that a new reduction pulse begins every 16.7 ms (60 Hz application rate). The cumulative nature of the reduction pulses is evident in the FIG. 7.

Example 5

The use of reduction pulses to achieve a sequence of uniform gray levels depending upon the number of pulses is demonstrated by using the same cell as Example 2. FIG. 6 and Example 2 were used to determine the range of pulse voltages and widths to use for reduction pulses that provide uniform gray levels. It is convenient to choose a fixed voltage and from FIG. 6 to determine the range of pulse widths that can provide uniform gray. In this Example we choose 45V in which case the pulse widths that can provide uniform gray are any width shorter than approximately 1.0 ms; however, if the pulses are shorter than 0.5 ms the amount of gray scale reduction will be smaller. FIG. 8 shows the reflectance for 16 levels of uniform reflectance with approximately equally spaced changes in gray level versus reduction pulse number. A 50V, 200 ms, 250 Hz pulse was used to erase the cell to the planar texture. The various shades of uniform gray were then obtained by applying a series of reduction pulses each consisting of one bipolar square wave with a pulse width (one complete cycle) depending upon that needed to obtain 16 equal gray level shifts (i.e., approximately the same reduction in reflectance is achieved by each gray scale level). The pulse widths for each of the reduction pulses that were used were: 0.44, 0.43, 0.42, 0.43, 0.45, 0.44, 0.47, 0.47, 0.51, 0.52, 0.60, 0.62, 0.76, 0.86, and 1.10 ms, respectively. A pause was placed between each reduction pulse such that new pulses begin every 16.7 ms (60 Hz application rate) in order to prevent aliasing with the 60 Hz room light incident on the cell while the pulses were being applied. From FIG. 8 one can choose a uniform gray level based upon the number of pulses to be applied. For example, to produce the first reflectance level (reflectance of 1.0 a.u.) 0 reduction pulses are applied whereas to achieve the gray scale level number 4, reduction pulses 1 to 3 are applied in succession.

Figure 9:
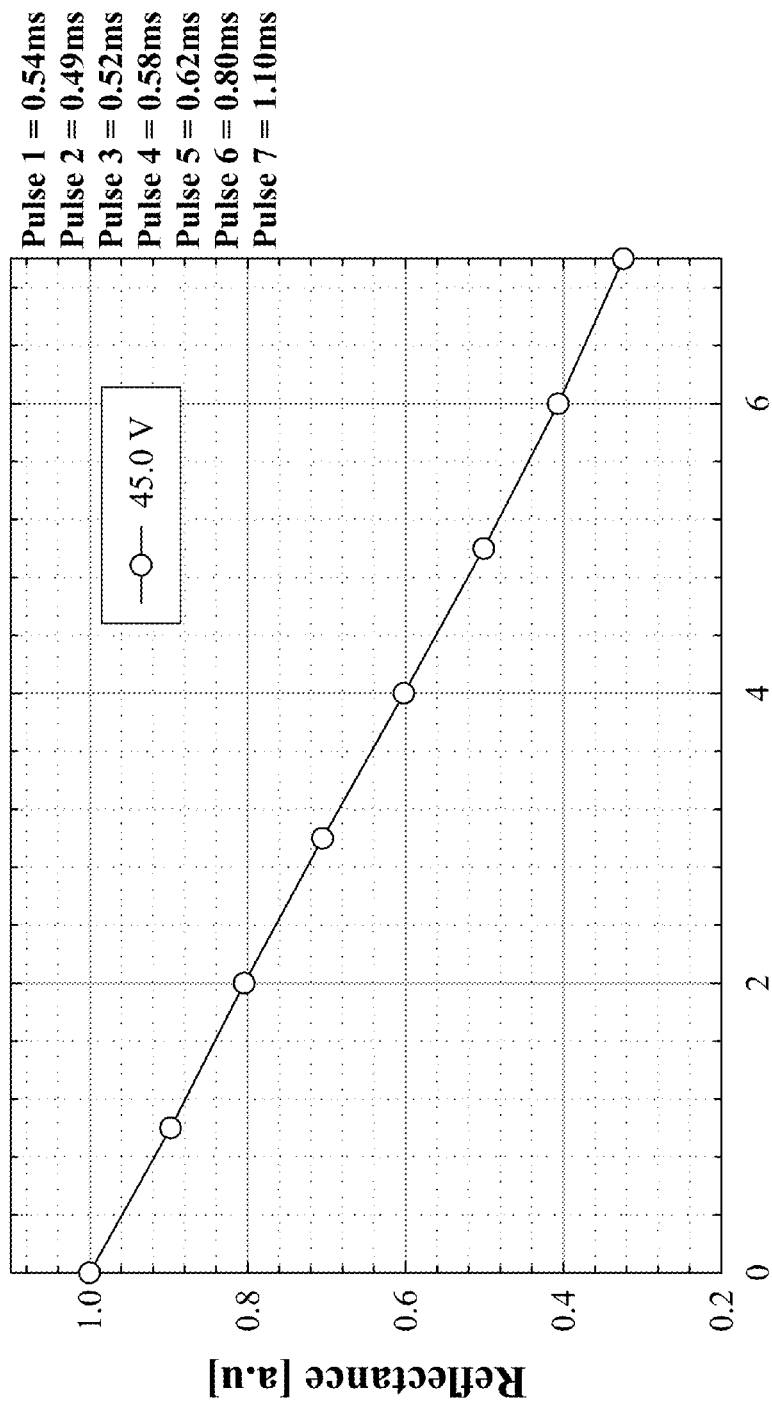
FIG. 9: Figure of Example 5 showing plot of 8 levels of uniform reflectance obtained by reduction pulses.

FIG. 9 shows a similar example but with 8 reflectance levels. This plot was achieved in the same way as the 16 level scheme above except that for producing the gray scale series the reflectance produced by the cell was divided into 8 segments (seven reduction pulses and gray scale levels). A 50V, 200 ms, 250 Hz pulse was used to erase the cell to the planar texture. The eight reflectance levels were then obtained by applying a series of reduction pulses each consisting of one bipolar square wave with a pulse width (one complete cycle) depending upon that needed to obtain the equal gray level shifts. These are found to be: 0.54, 0.49, 0.52, 0.58, 0.62, 0.80, 1.10 ms respectively. A pause was placed between each reduction pulse as before such that new pulses begin every 16.7 ms (60 Hz application rate) to prevent aliasing with room lights while the pulses were being applied. From FIG. 9 one can choose a uniform gray level based upon the number of pulses to be applied. For example, to produce the first reflectance level (reflectance of 1.0 a.u.) 0 reduction pulses are applied whereas to achieve the gray scale level number 4, reduction pulses 1 to 3 are applied in succession.

Figure 10:
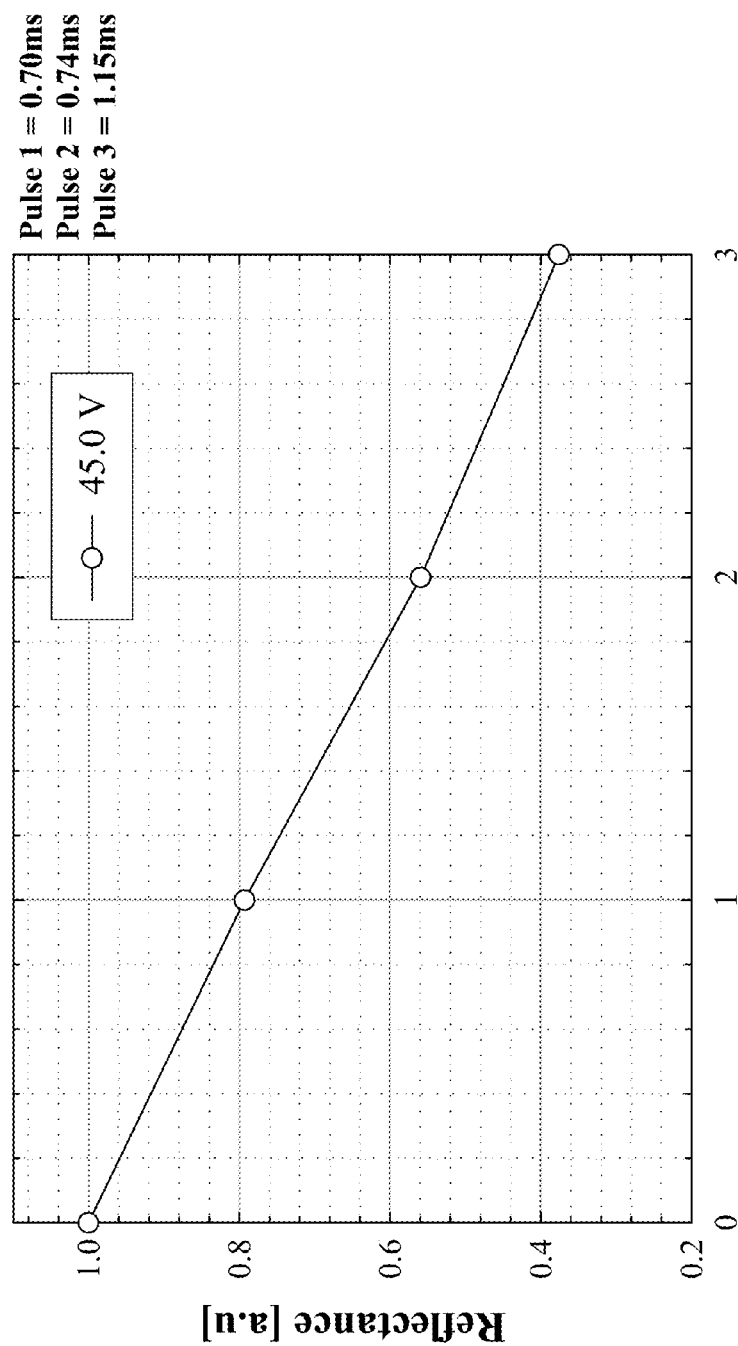
FIG. 10: Figure of Example 5 showing plot of 4 levels of uniform reflectance obtained by reduction pulses.

FIG. 10 shows a similar example but with 4 reflectance levels (3 reduction pulses and gray scale levels). This plot was achieved in the same way as the 16 level and 8 level schemes above except that the reflectance for the cell was divided into 4 levels. A 50V, 200 ms, 250 Hz pulse was used to erase the cell to the planar texture. The shades of uniform gray were then obtained by applying a series of reduction pulses each consisting of one bipolar square wave with a pulse width (one complete cycle) depending upon that needed to obtain equal gray level shifts. These are found to be: 0.70, 0.74, 1.10 ms respectively. A pause was placed between each reduction pulse such that new pulses begin every 16.7 ms (60 Hz application rate). From FIG. 10 one can choose a uniform gray level based upon the number of pulses to be applied. For example, to produce the first reflectance level (reflectance of 1.0 a.u.) 0 reduction pulses are applied whereas to achieve the gray scale level number 4, reduction pulses 1 to 3 are applied in succession.

Example 6

The use of reduction pulses for achieving uniform gray levels in an electronic skin made of flexible plastic substrates is explored in this example. The skin was fabricated from two substrates of 5 mil PET polymeric films with each substrate being 2×3 inches in size, about the size of a cell phone housing. The inner side of each substrate was coated with a conducting polymer to serve as the electrode. The spacing between the substrates was controlled by 4.0 μm spherical plastic spacers yielding a cell gap of that thickness. The bistable cholesteric material in the cell was a droplet dispersion prepared by the polymer induced phase separation (PIPS) approach according to U.S. Pat. No. 7,351,506. An electrooptic response curve showing the reflectance versus the voltage of a reduction pulse of width 2 ms was made using the same apparatus and experimental method of Example 2. The results are shown in FIG. 11 and discussed in the text.

What is claimed:

1. A method for providing an active layer of bistable cholesteric liquid crystal material with uniform gray scale reflectivity, comprising:
    plotting electrooptic response curves for said active layer showing response of reflectance to reduction pulse voltage, each said curve corresponding to a different reduction pulse width;
    identifying uniformity regions on said curves at which said active layer has a uniform gray scale reflectivity;
    selecting a voltage that intersects said identified uniformity regions on said curves;
    choosing a series of gray scale levels for said active layer that can achieve a substantially linear decrease in reflectance in response to increasing reduction pulse number; and
    selecting gray scale reduction pulse widths at said selected voltage which, based on said pulse widths of said curves that intersect said selected voltage, will produce gray scale reduction pulses that achieve each said gray scale level in the series at uniform reflectivity.

2. The method of claim 1 comprising providing a display including said active layer disposed between adjacent electrically conductive layers and a light absorbing layer adapted to absorb light passing through said active layer, said light absorbing layer being black or a back color,
    wherein said gray scale levels of the series are in a sequential decreasing order, comprising driving said display to a selected one of said gray scale levels by applying to said conductive layer all of said reduction pulses in order from a first reduction pulse, which reduces reflectivity from a preceding maximum reflectivity level, to said gray scale reduction pulse for said selected gray scale level.

3. The method of claim 2 wherein said gray scale levels are spaced such that a decrease in reflectance of each said gray scale level from an immediately preceding said gray scale level is similar for all said gray scale levels of the series.

4. The method of claim 2 wherein said reduction pulses are unipolar or bipolar.

5. The method of claim 2 wherein said reduction pulses are an AC square waveform.

6. The method of claim 2 comprising changing said gray scale level of said display to a gray scale level of higher reflectivity by:
    applying erasing voltage pulses effective to place said liquid crystal material in said planar texture at said maximum reflectivity; and
    conducting said step of driving said display to said selected gray scale level, where said selected gray scale level is said gray scale level of higher reflectivity.

7. The method of claim 2 wherein said display includes at least two stacked said active layers of bistable cholesteric liquid crystal material, each said active layer being disposed between adjacent said conductive layers, said cholesteric liquid crystal material of said active layers having pitch lengths effective to reflect light of different predetermined colors than each other, said layer of light absorbing material adapted to absorb light passing through said active layers, said light absorbing layer being black or a back color.

8. The method of claim 7 comprising two of said active layers, comprising providing said display with gray scale colors at said uniform gray scale reflectivity by applying said gray scale reduction pulses to said electrically conductive layers for one or both of said active layers.

9. The method of claim 7 comprising three of said active layers, comprising providing said display with gray scale colors at said uniform gray scale reflectivity by applying said gray scale reduction pulses to said electrically conductive layers for one, two or all three of said active layers.

10. A method for providing an active layer of bistable cholesteric liquid crystal material with uniform gray scale reflectivity, comprising:
plotting electrooptic response curves for said active layer showing response of reflectance to reduction pulse voltage, each said curve corresponding to a different reduction pulse width;
identifying a uniformity region on each of said curves at which said active layer has a uniform gray scale reflectivity;
choosing a series of gray scale levels for said active layer; and
selecting voltages and pulse widths which, based on said identified uniformity regions of said curves, will produce gray scale reduction pulses that produce said gray scale levels in the series.

11. The method of claim 10 wherein said gray scale levels are chosen to achieve a substantially linear decrease in reflectance in response to increasing reduction pulse number.

12. The method of claim 10 comprising identifying a uniformity line that intersects all of said curves at said uniformity region of each said curve, identifying intersection points where each of said gray scale levels intersects said uniformity line, wherein said gray scale reduction pulses comprise pulse widths and voltages on or near each of said intersection points.

13. The method of claim 12 comprising providing a display including said active layer disposed between adjacent electrically conductive layers and a light absorbing layer adapted to absorb light passing through said active layer, said light absorbing layer being black or a back color,
wherein said gray scale levels of the series are in a sequential decreasing order, comprising driving said display with uniform gray scale reflectivity to a selected one of said gray scale levels by applying to said conductive layers all of said reduction pulses in order from a first said reduction pulse, which reduces reflectivity from a preceding maximum reflectivity level, to said gray scale reduction pulse for said selected gray scale level.

14. The method of claim 13 wherein each said gray scale level is produced by applying one or more of said reduction pulses.

15. The method of claim 13 wherein said display includes at least two stacked said active layers of bistable cholesteric liquid crystal material, each said active layer being disposed between adjacent said conductive layers, said cholesteric liquid crystal material of said active layers having pitch lengths effective to reflect light of different predetermined colors than each other, said layer of light absorbing material adapted to absorb light passing through said active layers.

16. The method of claim 15 comprising two of said active layers, comprising providing said display with gray scale colors at said uniform gray scale reflectivity by applying said gray scale reduction pulses to said electrically conductive layers for one or both of said active layers.

17. The method of claim 15 comprising three of said active layers, comprising providing said display with gray scale colors at said uniform gray scale reflectivity by applying said gray scale reduction pulses to said electrically conductive layers for one, two or all three of said active layers.

* * * * *

UNITED STATES PATENT AND TRADEMARK OFFICE
CERTIFICATE OF CORRECTION

PATENT NO.         : 8,502,763 B2                                              Page 1 of 1
APPLICATION NO.    : 13/269824
DATED              : August 6, 2013
INVENTOR(S)        : Duane W. Marhefka et al.

It is certified that error appears in the above-identified patent and that said Letters Patent is hereby corrected as shown below:

On the title page, Item (75), in Inventors, please delete "Venkatataman" and add -- Venkataraman --

In the specification, column 3, line 17, please delete "voltage>" and add -- voltage$\geq$ --

Signed and Sealed this
Eighth Day of October, 2013

Teresa Stanek Rea
*Deputy Director of the United States Patent and Trademark Office*